INVENTORS:
Warren S. Liebman
Don B. Carson
Charles A. Dolejs
BY:
ATTORNEYS

Jan. 21, 1969  W. S. LIEBMAN ET AL  3,422,848
MULTIPORT ROTARY DISC VALVE WITH LINER PROTECTION MEANS
Filed June 9, 1966

INVENTORS:
Warren S. Liebman
Don B. Carson
Charles A. Dolejs

BY:
*James R. Hoatson Jr.*
*William H. Page II*

ATTORNEYS

INVENTORS:
Warren S. Liebman
Don B. Carson
Charles A. Dolejs

ATTORNEYS

Jan. 21, 1969

W. S. LIEBMAN ETAL 3,422,848

MULTIPORT ROTARY DISC VALVE WITH LINER PROTECTION MEANS

Filed June 9, 1966

INVENTORS:
Warren S. Liebman
Don B. Carson
Charles A. Dolejs

BY:
*James R. Hoatson Jr.*
*William H. Page II*
ATTORNEYS

United States Patent Office 3,422,848
Patented Jan. 21, 1969

3,422,848
MULTIPORT ROTARY DISC VALVE WITH
LINER PROTECTION MEANS
Warren S. Liebman, Morton Grove, Don B. Carson,
Mount Prospect, and Charles A. Dolejs, Arlington
Heights, Ill., assignors to Universal Oil Products
Company, Des Plaines, Ill., a corporation of Delaware
Filed June 9, 1966, Ser. No. 556,400
U.S. Cl. 137—625.15            10 Claims
Int. Cl. F16k 11/02

ABSTRACT OF THE DISCLOSURE

A plastic liner construction for a multiport rotary valve comprising a discular rotor and stator, in which valve a plurality of circumferentially spaced peripheral ports in the rotor are moved into registry with corresponding ports in the stator, the latter having a greater total number of peripheral ports than the rotor. The plastic liner, which is attached to the rotor and bears against the flat seating surface of the stator, is provided with a number of peripherally spaced blind recesses which register with blanked-off stator ports. A rigid reinforcing plate, disposed within each blind recess, is drawn up tightly against the inner transverse face of the recess. This design minimizes scarring and erosion of the liner during valve indexing and reduces cross-port leakage.

---

This invention relates to the art of multiport rotary disc valves and more particularly to a lined multiport rotary disc valve incorporating a novel liner construction.

A multiport rotary disc valve of the type herein dealt with is the subject of U.S. Patent 3,040,777. As described therein, such valve comprises a stator plate and a rotor plate maintained in fluid-tight contact therewith. The stator is provided with a number of peripheral ports which are spaced around the periphery of circumference of the stator. The rotor is also provided with a number of peripheral ports which are sized and located so as to come into registery with the stator peripheral ports at a number of adjusted angular positions of the rotor. Disposed radially inwardly of the stator and rotor peripheral ports are a plurality of concentric circular grooves or tracks which may be formed in either the stator bearing surface or the rotor bearing surface or partly formed in each of such bearing surfaces: separate conduit means are provided through the stator member to communicate with each individual circular groove. The rotor member is further provided with channels or conduits which connect each of the aforementioned rotor peripheral ports with a corresponding one of said grooves. The rotor is stroked or indexed in predetermined increments through 360° whereby each of the rotor peripheral ports, and consequently its associated circular groove, is placed into fluid communication with successive stator peripheral ports. The main function of such rotary valve is to provide a unitary stream connecting-disconnecting means whereby a first group of conduits may be simultaneously connected to selected conduits from a second group of conduits, in a predetermined cyclic sequence, while at the same time affording a structure wherein cross-port or inter-port leakage, that is, unintended fluid flow between two or more ports, is effectively eliminated.

As further disclosed in U.S. Patent 3,040,777, it is frequently advantageous to incorporate a plastic sheet or lining into the planar bearing surface between the stator and rotor whereby metal-to-metal contact is avoided. The liner may be suitably attached to the stator or to the rotor, or both stator and rotor may each be provided with a plastic sheet or liner. The liner preferably comprises a plastic having self-lubricating properties such as tetrafluoroethylene resins commercially available, for example, as Teflon or Kel-F. The liner may be reinforced with glass cloth, metal screening, particulated binder and the like. The liner minimizes cross-port leakage, protects the valve bearing surfaces from scarring, and reduces the torque requirement for valve indexing.

According to previous practice, the liner was constructed of a single continuous sheet of uniform thickness, usually circular in shape, with openings therethrough to match the various ports of the member to which it was attached. A particularly preferred arrangement employs a construction in which the liner is attached to the rotor, the stator being unlined, so that the bearing surface of the valve involves plastic-to-metal contact. Although such conventional design provided a highly efficient multiport valve, it was nevertheless found necessary to replace the liner from time to time due to excessive wear. It was ascertained that the liner wear arose primarily from the action of the stator peripheral ports upon the liner during rotor indexing. The number of rotor peripheral ports is generally less than the number of stator peripheral ports (for example, a typical valve may have 24 equally spaced stator peripheral ports and 5 asymmetrically spaced rotor peripheral ports). Thus, those circumferential portions of the plastic liner which are devoid of rotor peripheral ports will overlie and blank off several stator peripheral ports at any given time. When the rotor is stroked from one adjusted position to the next, the relatively sharp edges of these "blanked" stator ports tend to cut into the liner. It was further found that this situation was often aggravated by leakage of process fluid under pressure behind the liner, e.g., between the liner and the rotor undersurface, causing the liner to swell or bulge outwardly into the stator peripheral ports. The result was not only excessive inter-port and cross-port leakage, but also premature failure of the liner. If the liner were not replaced in time, isolated or general areas of metal-to-metal contact between rotor and stator would develop, leading eventually to severe erosion and scarring of both metal surfaces.

Our invention is therefore directed to a novel liner construction which substantially eliminates the aforesaid disadvantages. One object of our invention is to provide a lined multi-port rotary disc valve in which cutting, scarring or other erosion of the liner is reduced to a minimum. Another object of our invention is to provide an improved valve liner for a multi-port rotary disc valve having a substantially increased operating life. Still another object of our invention is to provide a valve in which cross-port and inter-port leakage are substantially avoided for a prolonged onstream time.

Briefly stated, the invention broadly involves the provision of a plurality of blind recesses in the undersurface or bearing surface of the plastic liner which are so sized and spaced as to register with the blanked-off stator ports in each of the several adjusted angular positions of the rotor. In addition, there is disposed within each of these recesses a plate-like reinforcing member, slightly smaller than the inner transverse face of the recess, and which is relatively rigid in comparison with the softer and more flexible plastic liner. The reinforcing member is suitably attached to the rotor, as by machine bolts or rivets, and is drawn up tightly against the inner transverse face of its respective recess.

One embodiment of our invention is directed to an improved liner construction for a multi-port rotary valve, said valve comprising a stator having a substantially flat first seating surface, a rotor-plastic liner assembly having a second seating surface in fluid-tight contact with said first seating surface, said second seating surface being formed by said plastic liner attached to and in contact with said rotor, a first set of ports in the stator spaced around the axis of rotation of the rotor, a second set of ports in the rotor-liner assembly lesser in number than said first set also spaced around said axis of rotation and arranged to register with selected ports of said first set at various adjusted angular positions of the rotor, which improved liner construction comprises a plurality of blind recesses in said liner equal in number to the difference between said first and second sets and spaced around said axis of rotation and arranged to register with the remaining ports of said first set, other than said selected ports, at said various adjusted positions, each of said recesses being at least coextensive with each of the ports of said first set when in registry therewith; a relatively rigid plate-like reinforcing member within each of said recesses; and means securing each of said reinforcing members to said rotor and maintaining the rear face of the member in tight contact with the inner transverse face of its respective recess.

In certain applications it has been found that the accumulation of high pressure process fluid by leakage into the region or surface of contact between the rotor and the plastic liner can be quite substantial, and can actually cause deformation of the reinforcing plate itself. Such accumulation of trapped fluid tends to become concentrated around the vicinity of the leading edge of the reinforcing member (the term "leading edge" is to be interpreted with reference to the direction of rotation of the complete rotor-plastic liner assembly). Pressure deformation of the reinforcing plate is more likely to occur with larger size rotary valves, as for example, valves having rotor diameters of from 1.5 feet up to 5 feet or more. Restrictions on manufacturing tolerances are such that it is not practically possible to ensure perfect alignment of the recesses with the blanked-off stator ports. Therefore, in those instances where too much of the unreinforced part of the liner happens to overlie a stator port, so that it is not supported by the main or bearing surface of the stator, the resulting area and force imbalance can develop an excessive moment on the reinforcing plate leading to its failure.

It is, therefore, a more specific and preferred embodiment of our invention to further provide a pressure relief means in combination with the plate-like reinforcing member. Such pressure relief means may take the form of at least one internal elongated dead-ended passageway for each recess, said passageway extending along the surface of contact between the rotor and the plastic liner and being adjacent to its respective recess and the plate-like reinforcing member disposed therein, and a pressure relief vent or aperture through the reinforcing member and the plastic liner which is in fluid communication with the passageway. The pressure relief means may also take the form of a plurality or network of mutually intersecting internal elongated dead-ended passageways, disposed in the immediate region of each of the blind recesses, the passageways extending along the surface of contact between the rotor and the plastic liner and being adjacent to their respective recess and the plate-like reinforcing member disposed therein, said network of passageways being approximately coextensive with the projected area of the reinforcing member, and a pressure relief aperture through the reinforcing member and the liner communicating with the network of passageways.

Reference to the accompanying drawing and the following description will more clearly demonstrate the novel design and construction of the present valve liner.

FIGURE 1 is a sectional elevation view of a typical multi-port rotary disc valve embodying the invention.

FIGURE 2 of the drawing is a partially sectioned plan view of the valve taken along line 2—2 of FIGURE 1.

FIGURE 3 of the drawing is a plan view of the undersurface of the rotor plastic liner assembly, looking upwardly, taken along line 3—3 of FIGURE 1.

FIGURE 7 is an enlarged fragmentary sectional elevation view of the valve stator, rotor and lining carried thereby, illustrating the pressure relief means above referred to.

Figure 7:
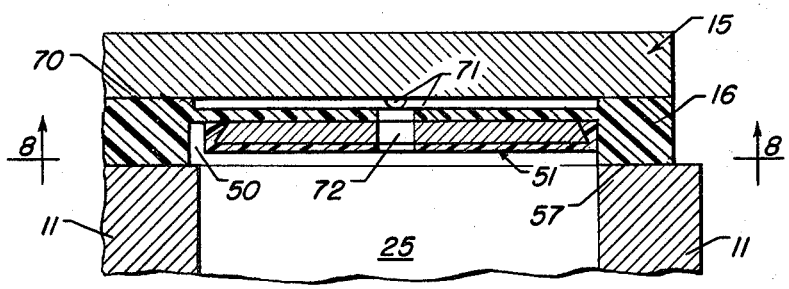
Figure 8:
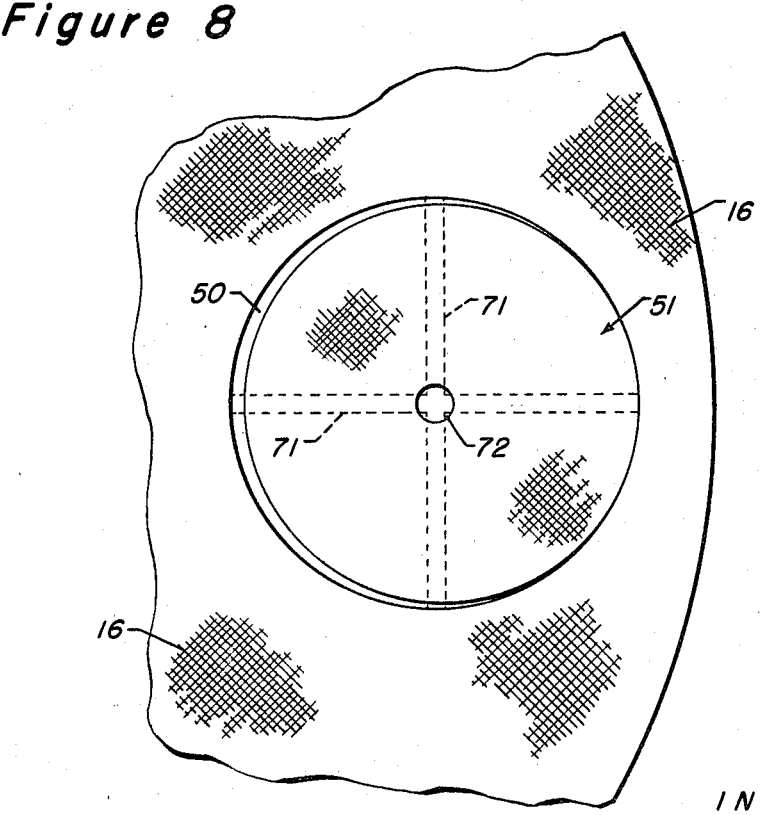

FIGURE 8 of the drawing is a plan view of the undersurface of the rotor-plastic liner-reinforcing member assembly, looking upwardly, taken along line 8—8 of FIGURE 7.

Figure 1:
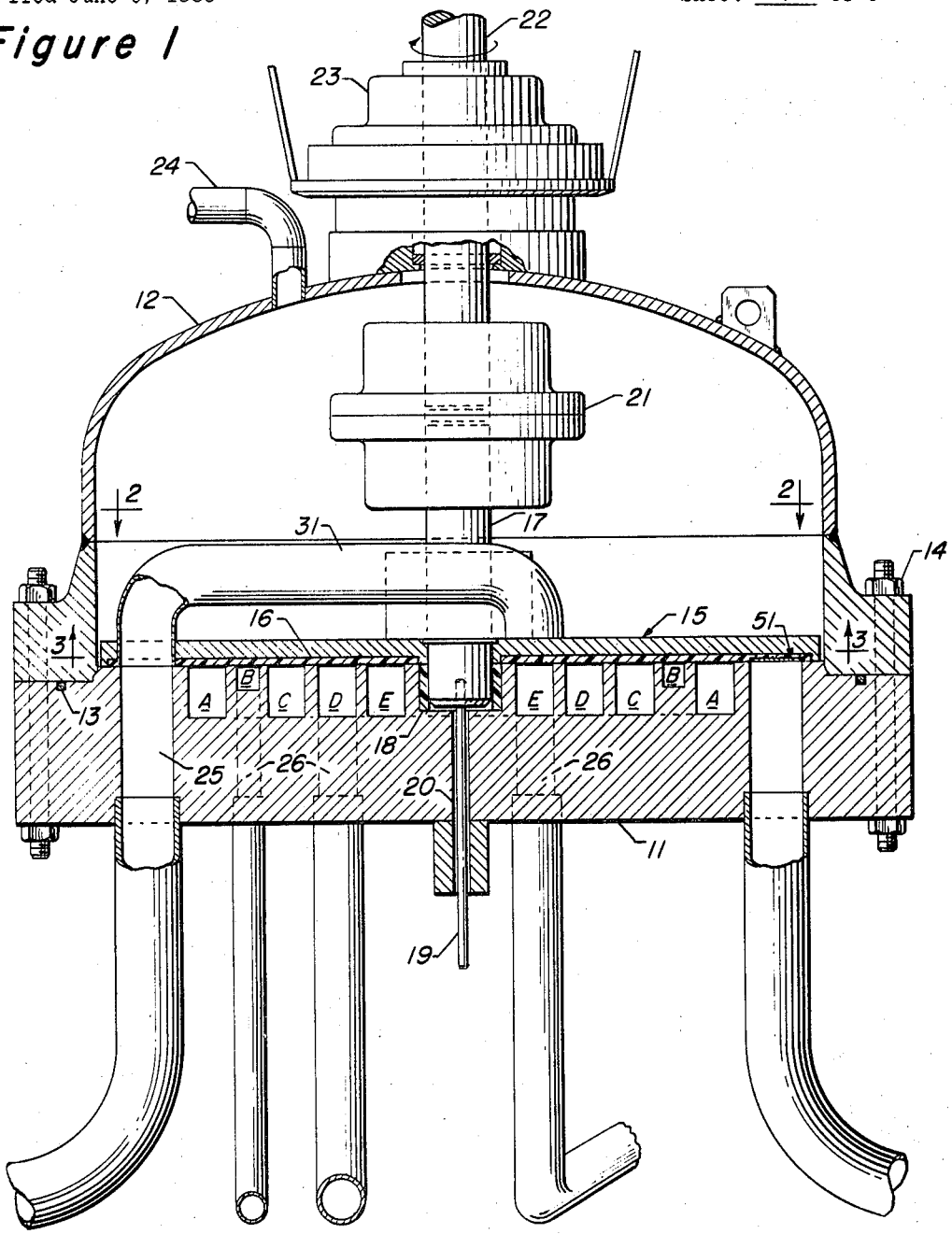

With reference first to FIGURE 1, the rotary valve itself comprises a lower stator member 11, a rotor member 15 maintained in fluid-tight contact therewith through a plastic lining 16 attached to the undersurface of the rotor member and free to rotate in a horizontal plane, and an upper pressure dome or casing 12. Pressure dome 12 is sealably secured to stator 11 by a number of circumferentially spaced throughbolts 14, the seal being augmented by means of an O-ring 13 disposed around the extreme periphery of stator 11. Stator 11 is preferably made relatively thick, whereas rotor 15 is formed of a relatively thin metal plate which is free to deflect and conform to the bearing surface of stator 11 under the the influence of seating pressure. This seating pressure is supplied by means of a fluid, either liquid or gas, contained within the pressure dome 12 and admitted thereto by means of a pressuring tap 24. The plastic sheet or lining 16 is suitably attached to the undersurface of rotor plate 15 as by resin bonding, bolting or a combination of these. Lining 16 is formed of a solid deformable plastic such as polyethylene, nylon, polyvinyl resins, and the like. Preferably, however, the lining 16 is formed of a plastic having high thermal stability and self-lubricating properties such as tetrafluoroethylene polymers including Teflon, Teflon-impregnated glass cloth, Kel-F, and the like.

Rotation of the rotor member 15 is effected by means of a lower shaft 17 attached thereto. The lower end of shaft 17 is inserted into a central well and bears against an annular sleeve 18 which could be fashioned of bronze or plastic, for example. Shaft 17 is provided with a downwardly extending guide pin 19, inserted into a guide pin bore 20 in stator 11, to facilitate precise alignment of the rotor during assembly of the valve. The lower shaft 17 is connected to an upper shaft 22 throught a flexible coupling member 21. The upper shaft 22 projects upwardly through a shaft seal member 23 and this shaft 22 is connected to a suitable rotary drive means (not illustrated) for effecting incremental unidirectional rotation of the rotor. Such drive means may comprise, for example, a ratchet and pawl device operated by pneumatic or hydraulic pistons, or a pin and disc device as described in U.S. Patent 2,948,166.

Figure 2:
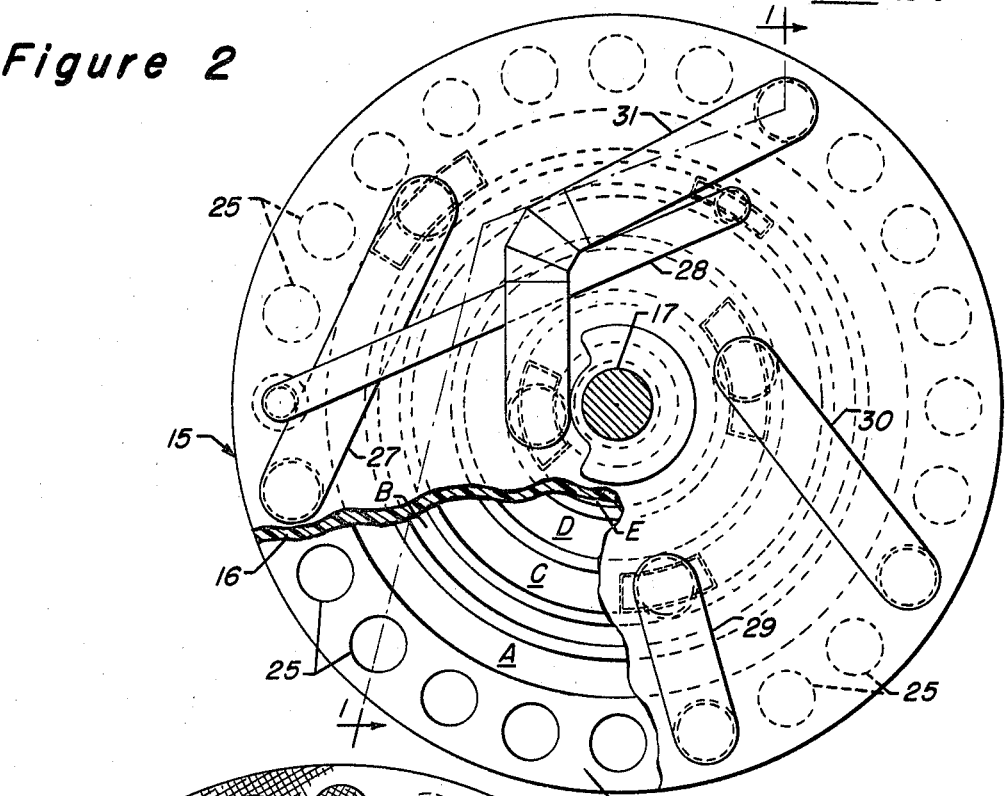

As further illustrated in FIGURE 1 and also in the plan view of FIGURE 2, there are provided through stator 11 a number of outer or peripheral ports 25. In the particular example illustrated, there are 24 of these stator peripheral ports equally spaced 15° apart. Disposed radially inwardly of the peripheral ports 25 and formed in the bearing surface of stator 11 are a number of concentric circular grooves or tracks; in this particular example there are five such tracks, designated A, B, C, D and E, depicted in elevation in FIGURE 1 and in plan view in FIGURE 2. Individually communicating with each of these concentric circular tracks are five stator inner ports 26, of which three are visible in the elevation view of FIGURE 1. Fluid communication from each of the concentric circular tracks to selected stator peripheral ports 25 is provided by five U-shaped crossover tubes 27, 28, 29, 30 and 31, extending across the immediately above rotor member 15. These are visible in FIGURES 2 and 3. Tube 27 connects outer rotor port 32 with inner rotor port 37. Tube 28 connects outer rotor port 33 with inner rotor port 38. Tube 29 connects outer rotor port 34 with inner rotor port 39. Tube 30 connects outer rotor port 35 with inner rotor port 40. Tube 31 connects outer rotor port 36 with inner rotor port 41. The inner rotor ports 37, 38, 39, 40 and 41 are arcuate in shape and continuously register respectively with tracks A, B, C, D and E. The outer rotor ports 32, 33, 34, 35 and 36 are circular in shape and are sized and arranged to register with five corresponding stator peripheral ports 25 at a time, for each of several adjusted angular positions of the rotor member (in this case, there are 24 such adjusted positions).

Figure 3:
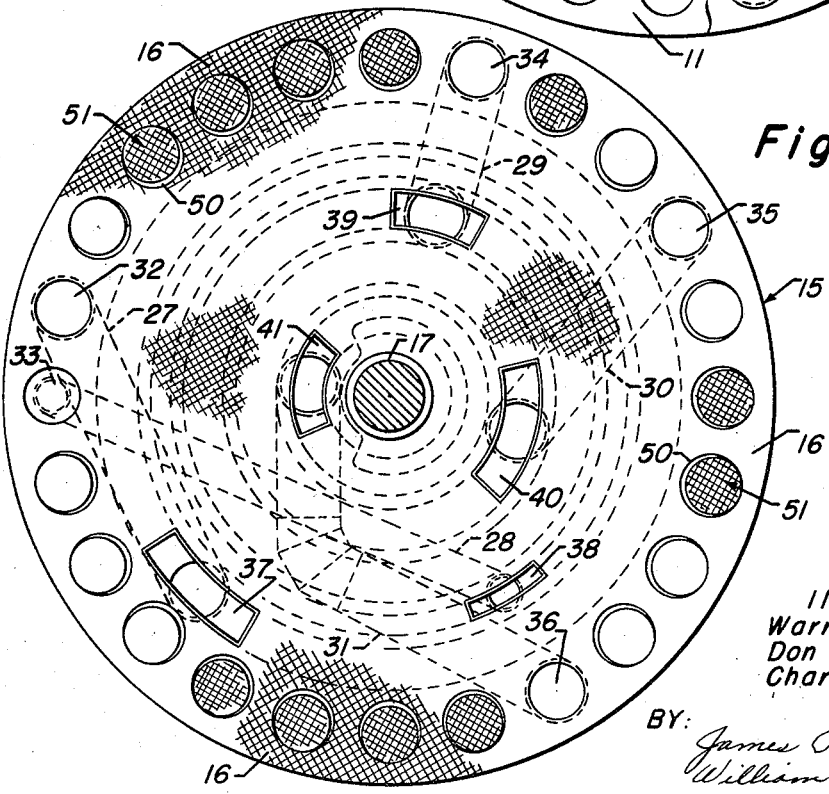

It will be seen that when the rotor occupies any given adjusted angular position, the number of stator peripheral ports 25 which will be blanked off by the lined undersurface of the rotor is equal to the number of stator peripheral ports less the number of rotor peripheral ports; in this particular illustration, there are 19 such blanked-off stator ports. With reference to FIGURE 3, our improved liner construction comprises a plurality of peripherally spaced blind recesses 50 formed in the undersurface of plastic liner 16. These recesses 50 are so sized and arranged as to register with the blanked-off stator ports when the rotor is in any of its adjusted positions. The number of recesses is made equal to the number of blanked-off stator ports so that every stator port registers either with one of the five outer rotor ports 32, 33 . . . 36 or with a blind recess 50, during successive adjusted positions of the rotor. Preferably the transverse opening of each recess 50 is at least as large as the transverse opening of its associated stator port 25 so as to be at least coextensive therewith. In the particular embodiment illustrated, the transverse openings of ports 25 and the transverse openings of recesses 50 are circular in shape, the transverse openings of recesses 50 being of slightly larger diameter than the stator ports. As hereinafter explained, these recesses are also desirably positioned slightly radially inwardly toward the axis of rotation of the rotor so that the recesses are positioned eccentrically with respect to the stator ports 25 when the rotor is in any of its adjusted positions. Further in accordance with our invention, there is mounted within each of said blind recesses 50 a relatively rigid plate-like reinforcing member which, in the embodiment illustrated, is a disc 51. Each of the discs 51 preferably has substantially the same diameter as its associated blanked-off stator port 25 and is positioned so as to be coaxial or have a common center therewith when the rotor is in any of its adjusted angular positions.

Figure 4:
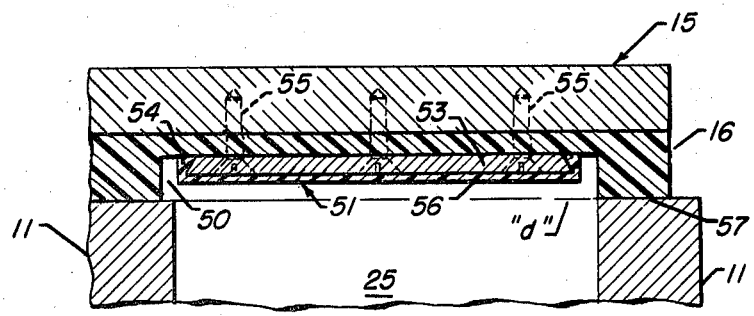
FIGURES 4, 5 and 6 are enlarged fragmentary sectional elevation views of the valve rotor and lining carried thereby illustrating in more detail respectively different embodiments of the plate-like reinforcing member.

FIGURE 4 illustrates one embodiment of a typical reinforcing member 51. It comprises a relatively rigid discular plate 53, which may be fashioned of a metal such as steel, stainless steel, brass and the like, or a hard plastic; the outer circular edge of the plate 53 is desirably beveled inwardly, as shown, toward the rotor member 15. Plate 53 is coated with a layer of plastic, such as Teflon, the area of coating at least including the outer face of plate 53, and preferably also its beveled edge. The reinforcing member 51 is secured within its recess 50 by machine screws 55 which are tapped into the rotor 15, whereby the rear face of the reinforcing member is held in tight contact with the inner transverse face of recess 50. As employed herein and in the appended claims, the term "rear face" of the reinforcing member connotes the face which is more remote from the surface of the stator, whereas the term "outer face" of the reinforcing member connotes the face which is closer to the surface of the stator. The outer face 56 of the reinforcing member 51 is spaced inwardly from the surface 57 of the plastic liner by a distance $d$. For a rotary valve of commercial size, this clearance $d$ may range from about 0.005 inch to about 0.100 inch. The reinforcing members 51 serves the double function of peripherally securing the entire liner 16 to the rotor, and also minimizing leakage of process fluid between the liner 16 and the rotor 15, particularly in the immediate region of the stator ports 25, where such leakage could otherwise cause deformation of the plastic liner into the blanked-off ports and therefore could give rise to rapid failure of the liner in this region. By providing a clearance $d$, the reinforcing member 51 itself does not contact the stator surface and is not subject to frictional wear, the rotor seating force being distributed over the surface 57 of the plastic liner. It was previously noted that each recess 50 is preferably positioned eccentrically toward the axis of rotation with respect to its associated outer stator port. Since the reinforcing discs 51 are substantially the same size and are coaxial with the outer stator ports, this means that the reinforcing discs 51 are also eccentrically disposed with respect to their recesses 50. The purpose of such eccentric ararngement is to allow sufficient clearance for differential temperature-induced expansion as between the plate 53 and the main body of the lining 16, for in many process applications of the valve, the reinforcing discs will be subject to a fairly wide temperature variation during the course of one valve revolution. The plastic coating 54 may be applied to plate 53 by any means known to the art; however, the design of this FIGURE 4 embodiment is especially suited for applying the plastic as a powder or as a liquid spray.

Figure 5:
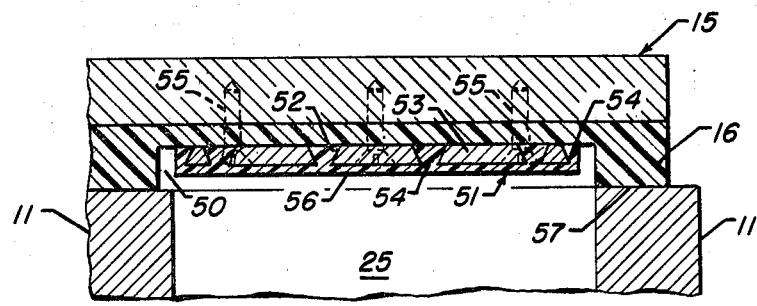

FIGURE 5 illustrates a variant of the FIGURE 4 arrangement in which there are provided, in the beveled plate 53, a number of perforations 52. Perforations 52 are preferably inwardly beveled as shown. A layer of plastic 54 encloses the beveled edge and the outer face of the plate 53, and fully penetrates perforations 52. This design is particularly adapted to applying the plastic layer to the reinforcing disc by pressure molding. The beveled edges of the perforations 52 achieve a tighter bond between the plastic layer 54 and the plate 53 and also permit the use of thicker plates 53.

Figure 6:
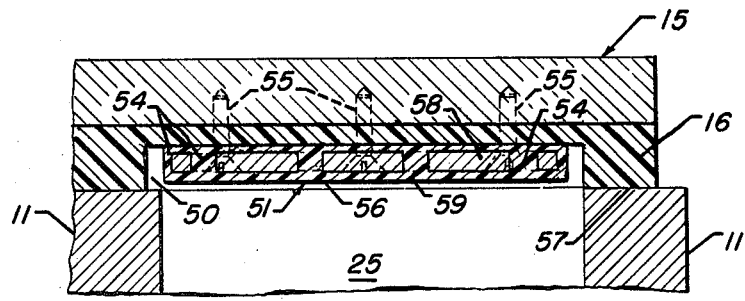

FIGURE 6 illustrates another embodiment of reinforcing member construction utilizing a perforated, non-beveled plate 58, the perforations 59 thereof being straight or cylindrical rather than tapered. In this case, the rigid plate 58 is completely enveloped in a layer of plastic 54, that is, both the rear and outer faces of plate 58, as well as the edge thereof, is covered with a suitable plastic, such as Teflon. The plastic may be applied to the plate 58 by a pressure enveloping technique.

FIGURES 7 and 8 illustrate a preferred embodiment of the invention which incorporate a pressure relief means in conjunction with a reinforcing member. The rotor member 15 is shown in an adjusted position whereby the recess 50, formed in the liner 16, is in registry with a stator port 25. A reinforcing disc-like member 51, similar in construction to that of FIGURE 4, is mounted within the recess. Reinforcing member securing means, such as machine screws, will be employed but are omitted here for clarity. It will be noted that recess 50 has a slightly larger diameter than stator port 25 and is positioned eccentrically inwardly toward the valve axis of rotation, which is some distance to the left of FIGURES 7 and 8. The reinforcing disc 51 is of substantially the same diameter as port 25 and is approximately coaxial therewith. The surface or plane of contact between the rotor and the plastic liner is designated by numeral 70; this is the region into which trapped process fluid tends to accumulate. Although FIGURE 7 shows the desired substantially exact alignment of recess 50 and port 25, this is not always practically possible in commercially sized valves, as noted previously. Thus, one can imagine a situation wherein liner 16 is displaced slightly to the left with respect to stator 11; this will result in the face 57 of the plastic liner overhanging the wall of port 25. Since the pressure of the process fluid trapped along surface 70 is usually substantially higher than the pressure existing within stator port 25, the area and force imbalance resulting from said overhang can generate a moment acting downwardly upon reinforcing member 51 which is sufficiently intense to cause its failure.

In order to obviate this possibility, there is provided, in the region of and directly over the recess 50, a set or network of internal elongated dead-ended passageways 71 which extend along and interrupt the surface of contact 70, and which mutually intersect near or at the center of reinforcing disc 51. These passageways 71 may be formed as grooves entirely in the upper surface of liner 16, or as grooves entirely in the undersurface of rotor 15, or by a combination of grooves partly in rotor 15 and partly in liner 16. In addition, there is provided a central positioned pressure relief vent or aperture 72 through the reinforcing member 51 and through the portion of the liner 16 thereabove, so as to come into fluid communication with passageways 71. Thus, the trapped fluid has a means of egress via passageways 71 and aperture 72 into the stator port 25, and the aforesaid deforming forces are effectively eliminated. In FIGURES 7 and 8, there are shown four such passageways which are spaced approximately 90° apart and which are approximately coextensive with the radii of the discular reinforcing member 51; preferably the passageways 71 extend radially outwardy, with respect to discular reinforcing member 51, at least as far as the periphery of member 51. In some cases, a single passageway may be adequate, and in other cases 6, 8 or more passageways may be utilized. Also, a symmetrical pattern of passageways need not necessarily be employed and they may be arranged, for example, in a random crisscross fashion over a substantial portion of the projected area of the reinforcing member, or they may be concentrated in the region around the leading edge of the disc, since that appears to be where most of the build-up of trapped process fluid occurs. It will be apparent that more than one central aperture may be provided, e.g., a plurality of spaced apertures may be used, the aggregate total area of which may range from about 0.5% up to about 25% of the gross area of the reinforcing disc. A greater aperture area should be avoided, since this may lead to a weakening of the rigidity of the disc and hence negative its main function.

Exemplary dimensions for a typical multi-port rotary disc valve, insofar as they relate to the liner construction of this invention, are set forth in Table I below. All primary valve parts other than the plastic liner, but including the reinforcing discs, are of carbon steel. The composition of the liner, by weight, is 15% fiberglass, 5% $MoS_2$ and 80% Teflon.

Table I

| | Inches |
|---|---|
| Rotor diameter | 34 |
| Rotor thickness (reduced to 13/16" at liner area) | 1 |
| Liner thickness | 1/4 |
| Recess depth | 3/32 |
| Recess diameter | 2 7/8 |
| Reinforcing disc diameter | 2 3/4 |
| Reinforcing disc thickness (exclusive of plastic coat) | 0.050 |
| Clearance $d$ (FIGURE 4) | 0.010 |
| Pressure relief aperture diameter | 0.50 |

The novel liner construction of our invention substantially reduces the cutting, scarring and erosion of conventional liners employed in similar service, achieves a substantially increased valve operating life, and materially reduces cross-port and inter-port leakage.

We claim as our invention:

1. In a multiport rotary valve comprising a stator having a substantially flat first seating surface, a rotor-plastic liner assembly having a second seating surface in fluid-tight contact with said first seating surface, said second seating surface being formed by said plastic liner attached to and in contact with said rotor, a first set of ports in the stator spaced around the axis of rotation of the rotor, a second set of ports in the rotor-liner assembly lesser in number than said first set also spaced around said axis of rotation and arranged to register with selected ports of said first set at various adjusted angular positions of the rotor, an improved liner construction comprising:

(a) a plurality of blind recesses in said liner equal in number to the difference between said first and second sets and spaced around said axis of rotation and arranged to register with the remaining ports of said first set, other than said selected ports, at said various adjusted positions, each of said recesses being at least coextensive with each of the ports of said first set when in registry therewith;

(b) a relatively rigid plate-like reinforcing member within each of said recesses; and (c) means securing each of said reinforcing members to said rotor and maintaining the rear face of the member in tight contact with the inner transverse face of its respective recess.

2. The structure of claim 1 further characterized in that said reinforcing member comprises a plastic-coated metal plate.

3. The structure of claim 1 further characterized in that said reinforcing member comprises a perforated metal plate with a layer of plastic over at least the outer face of the plate and fully penetrating the perforations therein.

4. The structure of claim 1 further characterized in that said reinforcing member comprises a rigid plate enveloped in a layer of plastic.

5. The structure of claim 1 further characterized in that the outer face of said reinforcing member is spaced inwardly from the surface of said plastic liner a distance of from 0.005 inch to 0.100 inch.

6. The structure of claim 1 wherein said plastic liner comprises tetrafluoroethylene.

7. The structure of claim 1 further characterized in that the ports of said first set and said recesses are circular, said recesses being of slightly larger diameter than and positioned eccentrically toward said axis of rotation with respect to the openings of said first set when the rotor is in any of said adjusted positions.

8. The structure of claim 7 further characterized in that said reinforcing members are discular and of substantially the same diameter as the ports of said first set and are coaxial with said last-named ports when the rotor is in any of said adjusted positions.

9. The structure of claim 1 further characterized in that said rotor-plastic liner assembly contains at least one internal elongated dead-ended passageway for each recess, said passageway extending along the surface of contact between said rotor and said plastic liner and being adjacent to its respective recess and the plate-like reinforcing member disposed therein, and a pressure relief aperture through said reinforcing member and said liner communicates with said passageway.

10. The structure of claim 1 further characterized in that said blind recesses are circular, said reinforcing members are discular, and, with respect to and in the region of each of said blind recesses, said rotor-plastic liner assembly contains a network of mutually intersecting internal elongated dead-ended passageways extending along the surface of contact between said rotor and said plastic liner and being adjacent to their respective recess and the plate-like reinforcing member disposed therein, said passageways being approximately coextensive with various radii of the discular reinforcing member, and a pressure relief aperture through said reinforcing member and said liner communicates with said passageways.

References Cited

UNITED STATES PATENTS

| | | |
|---|---|---|
| 3,026,899 | 3/1962 | Mischanski 137—625.31 XR |
| 3,040,777 | 6/1962 | Carson et al. 137—625.15 |
| 3,198,004 | 8/1965 | Roberts et al. 137—625.15 XR |

DANIEL BLUM, *Primary Examiner.*

U.S. Cl. X.R.

137—625.46